This invention relates to a non-skid traction device for automobiles, useful in increasing traction efficiency under adverse road conditions such as those of snow, ice, or mud. The present invention provides a very simply constructed, but very effective, device which is readily attached to a wheel, only one device for each wheel being necessary.

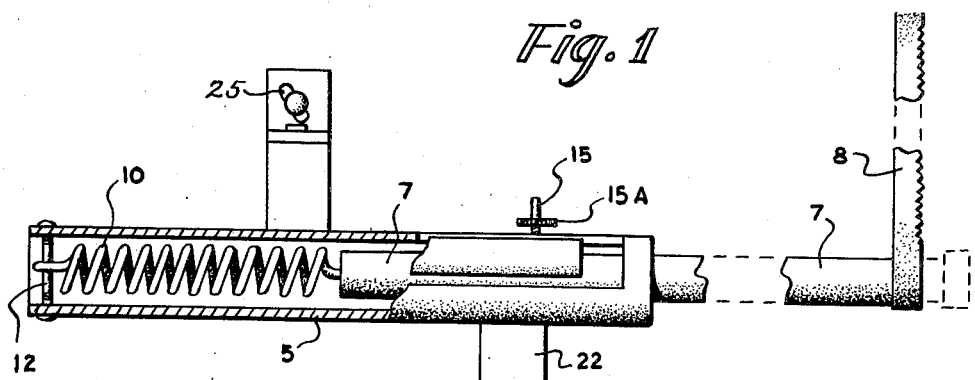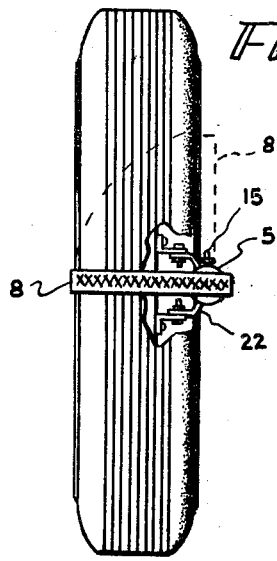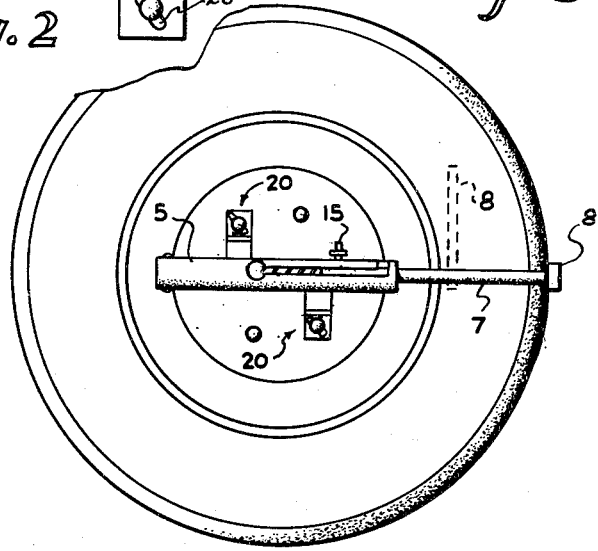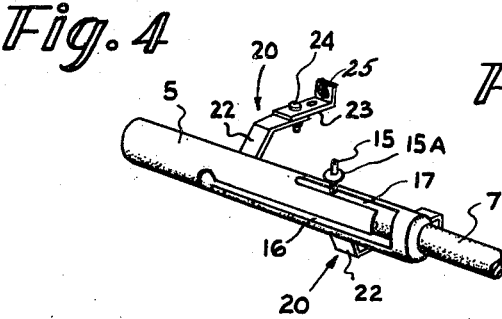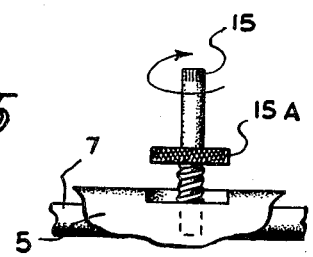
INVENTOR.
SEYMOUR MONT
BY Roy Griffith Jones
HIS ATTORNEY 3,055,411
AUTOMOBILE TRACTION DEVICE
Seymour Mont, 1770 Manor Drive, Irvington, N.J.
Filed May 26, 1961, Ser. No. 112,921
1 Claim. (Cl. 152—216)

The disclosure herein shows how the device may be fastened to the usual wheel lugs of different sized wheels, it being only required to remove the usual nuts from the lugs, place the brackets holding the device over the lugs, and replace the nuts.

The drawings illustrate the invention, and in these:

FIGURE 1 is a plan view of the device partly broken away to show internal structure;

FIGURE 2 is an end view of a tire and of the device attached;

FIGURE 3 is a side elevation of FIGURE 2;

FIGURE 4 is a perspective view of the device, omitting the tread thereof;

FIGURE 5 is a detail of part of FIGURE 4, showing a locking nut threaded on the pin which is secured to the slidable rod within the tube.

Referring to the drawings for a detailed description, the device comprises a round tube 5 which is open at both ends. A slidable round rod 7 is partly within the tube, and carries a traction or anti-skid tread 8 at its outer end and at right angles. The tread 8 is adapted to be placed crosswise on the tire, as shown in FIGURES 2 and 3, and is held thereagainst by the tension of a coiled spring 10. The latter is fastened at one end to the inner end of rod 7 and at its other end to a cross pin 12 which passes through an end portion of tube 5. A pin 15 is screwed into the rod 7 near the inner end of the latter, and extends through, and is movable in a slot formed in the wall of the tube. This slot, as clearly shown in FIGURE 4, is generally L-shaped, and comprises a pair of parallel branches 16 and 17 which extend lengthwise of the tube and are 90 degrees apart on the tube, and cross connect at their outer ends.

As shown in FIGURE 3, the device is mounted diametrically on the outer face of a car wheel, with the rod 7 pulled out, thus putting coiled spring 10 under greater tension, and with tread 8 across the wheel tire. When the tread is not across the tire, it lies adjacent the wheel, as indicated in dashed lines in FIGURE 3, having been turned 90 degrees by moving pin 15 from one branch of the mentioned slot to the other branch. When the rod 7 and tread 8 are in retracted position, pin 15 is in the longer branch 16 of the slot, and is in the shorter branch 17 when the rod and tread are extended. The inner end of branch 16 of the slot is enlarged laterally to receive a disk 15A which is threaded on the pin so that it may be moved down into said enlarged end of 16 to lock the rod and tread in retracted position.

To adjustably secure the device to the lugs of different sized wheels, a pair of similar, oppositely extending brackets 20 are secured to tube 5 at different points along its length, as shown in FIGURES 3 and 4. Each bracket comprises an angular piece 22 which is adjustably connected to a right angle iron 23 by a nutted bolt 24 passing through one of the holes shown. Angle irons 23 have oblique, radially-directed elongate holes 25 which permit the irons to fit onto lugs of different wheels.

What is claimed is:

The combination with a disked automobile wheel, of a single tube extending substantially across the diameter of the disk and secured to the outer face of the latter, a rod slidable and turnable in the tube, a tread secured and transverse to the rod at the outer end of the latter, a coiled spring within the tube and secured to the inner end of the rod and adapted to exert a pull on the rod when the latter is extended, said tube having a slot in its wall, said slot being generally L-shaped and having two parallel branches lengthwise of the tube and approximately 90 degrees apart on the tube, and communicating with each other at their outer ends, and a pin secured to the rod and extending through and movable in said slot, a disk threaded onto said pin, a branch of said slot being enlarged at its inner end to receive said disk for the purpose of locking said rod and tread in retracted position, and a pair of oppositely disposed adjustable brackets secured thereto and turnable and extensible so that they may be secured to different sizes of wheels.

References Cited in the file of this patent

UNITED STATES PATENTS

| | | |
|---|---|---|
| 1,257,145 | Stern | Feb. 19, 1918 |
| 1,561,897 | Allcutt et al. | Nov. 17, 1925 |
| 2,212,076 | Rollings | Aug. 20, 1940 |
| 2,453,273 | Scott | Nov. 9, 1948 |
| 2,767,761 | O'Higgins | Oct. 23, 1956 |